United States Patent
Hiljanen et al.

(10) Patent No.: US 11,650,602 B2
(45) Date of Patent: May 16, 2023

(54) METHOD, ARRANGEMENT AND USER INTERFACE FOR MANAGING MOBILE FOREST MACHINES AND TRANSPORT EQUIPMENT THEREFOR

(71) Applicant: Ponsse Oyj, Vieremä (FI)

(72) Inventors: Jarmo Hiljanen, Iisalmi (FI); Hanna Vilkman, Alapitkä (FI)

(73) Assignee: PONSSE OYJ, Vieremä (FI)

( * ) Notice: Subject to any disclaimer, the term of this patent is extended or adjusted under 35 U.S.C. 154(b) by 1114 days.

(21) Appl. No.: 16/328,452

(22) PCT Filed: Aug. 29, 2017

(86) PCT No.: PCT/FI2017/050606
§ 371 (c)(1),
(2) Date: Feb. 26, 2019

(87) PCT Pub. No.: WO2018/042077
PCT Pub. Date: Mar. 8, 2018

(65) Prior Publication Data
US 2021/0286374 A1    Sep. 16, 2021

(30) Foreign Application Priority Data
Aug. 30, 2016 (FI) .................... 20165645

(51) Int. Cl.
*G06F 3/048* (2013.01)
*G05D 1/02* (2020.01)
(Continued)

(52) U.S. Cl.
CPC ......... *G05D 1/0291* (2013.01); *G05D 1/0016* (2013.01); *G05D 1/0044* (2013.01);
(Continued)

(58) Field of Classification Search
None
See application file for complete search history.

(56) References Cited

U.S. PATENT DOCUMENTS 6,263,265 B1    7/2001  Fera
6,301,531 B1   10/2001  Pierro et al.
(Continued)

OTHER PUBLICATIONS

Finnish Search Report dated Mar. 21, 2017, issued by the European Patent Office in the corresponding Finnish Patent Application No. 20165645. (1 page).
(Continued)

*Primary Examiner* — Thanh T Vu
(74) *Attorney, Agent, or Firm* — Buchanan Ingersoll & Rooney PC

(57) ABSTRACT

A user interface for fleet management includes a first user interface zone and a second user interface zone, which are can be presented to the user simultaneously on the same first user interface. On the first user interface is presented, in response to a selection made by the user, simultaneously at least two parallel first selection elements, and from the selected at least one first selection element, at least one selectable first selection element related thereto and included in the next higher or lower hierarchical level. The second user interface zone is arranged to present information which is based on selections made by the user via the first user interface zone.

24 Claims, 6 Drawing Sheets

(51) Int. Cl.
   *G05D 1/00* (2006.01)
   *G06F 3/0482* (2013.01)
(52) U.S. Cl.
   CPC ... *G06F 3/0482* (2013.01); *G05D 2201/0201* (2013.01); *G06F 2203/04803* (2013.01)

(56) References Cited

U.S. PATENT DOCUMENTS

| | | |
|---|---|---|
| 6,647,356 B2 | 11/2003 | Pierro et al. |
| 6,850,869 B2 | 2/2005 | Pierro et al. |
| 6,996,498 B2 | 2/2006 | Pierro et al. |
| 7,783,507 B2 | 8/2010 | Schick et al. |
| 9,355,549 B2 | 5/2016 | Mcclintic et al. |
| 2002/0059075 A1 | 5/2002 | Schick et al. |
| 2002/0065698 A1 | 5/2002 | Schick et al. |
| 2002/0116149 A1 | 8/2002 | Pierro et al. |
| 2003/0055666 A1 | 3/2003 | Roddy et al. |
| 2004/0073324 A1 | 4/2004 | Pierro et al. |
| 2005/0154507 A1 | 7/2005 | Pierro et al. |
| 2011/0130905 A1 | 6/2011 | Mayer |
| 2011/0130906 A1 | 6/2011 | Mayer |
| 2011/0130916 A1 | 6/2011 | Mayer |
| 2014/0085086 A1 | 3/2014 | Knapp et al. |
| 2014/0088866 A1 | 3/2014 | Knapp et al. |
| 2014/0089054 A1 | 3/2014 | Knapp et al. |
| 2014/0214240 A1* | 7/2014 | Funke .............. G07C 3/00 701/2 |
| 2016/0078695 A1 | 3/2016 | Mcclintic et al. |
| 2016/0117059 A1 | 4/2016 | Folken et al. |
| 2017/0301150 A1 | 10/2017 | Wojciechowski |
| 2017/0314803 A1* | 11/2017 | Jacobson ............. G06F 3/04847 |

OTHER PUBLICATIONS

International Search Report (PCT/ISA/210) dated Nov. 23, 2017, by the Finnish Patent and Registration Office as the International Searching Authority for International Application No. PCT/FI2017/050606. (4 pages).

Notification of Transmittal of International Preliminary Report on Patentability (Chapter II of the Patent Cooperation Treaty) (PCT Rule 71.1) (Form PCT/IPEA/416) and International Preliminary Report on Patentability (PCT Article 36 and Rule 70) (Form PCT/IPEA/409) dated Dec. 10, 2018, in the corresponding International Application No. PCT/FI2017/050606. (12 pages).

Written Opinion (PCT/ISA/237) dated Nov. 23, 2017, by the Finnish Patent and Registration Office as the International Searching Authority for International Application No. PCT/FI2017/050606. (7 pages).

* cited by examiner

METHOD, ARRANGEMENT AND USER INTERFACE FOR MANAGING MOBILE FOREST MACHINES AND TRANSPORT EQUIPMENT THEREFOR

BACKGROUND

The invention relates to mobile forest machines and transport equipment therefor, and particularly to a method, arrangement and user interface for managing a fleet comprising forest machines and transport equipment therefor.

The management, maintenance and tracking of mobile forest machines and related transport equipment and reporting the operation thereof has traditionally been a challenge as the machines are typically working in large areas far from service points and possibly also beyond difficult journeys. Hence, a forest machine, which has developed a fault not possible to repair at the site of malfunction, may be difficult to transport to a service point and may incur significant costs. One example of such forest machinery includes harvesters, forwarders, and various working machines intended for use as forest machines, such as excavators provided with a harvester head and provided with a so-called measuring device for gathering and processing timber handling-related information and for controlling the harvester head. Such forest machines are typically working in demanding terrain and often far away from public roadways. When the number of machines to be managed increases, so does the amount of information needed for the management thereof, which hampers the finding of essential data especially from the standpoint of an entrepreneur or operator. In prior known solutions, it is also the changes, such as changes and replacements of equipment, which are often a source of trouble.

BRIEF DESCRIPTION OF THE INVENTION

Accordingly, it is an objective of the invention to develop a new method and an apparatus implementing the method for managing forest machines and transport equipment therefor. The objective is attained with a method and a system, which are characterized by what is stated in the independent claims. Preferred embodiments of the invention are presented in the dependent claims.

The present solution is based on the use of up-to-date information about fleet and/or about the working mode of individual working machines included therein for managing the fleet and the working mode of individual machines, for example for controlling the fleet and/or controlling and adjusting the working machines by utilizing remote communication.

A benefit in the method and arrangement of the present solution is that the machines and the fleet can be managed and maintained with a comprehensive arrangement capable of adapting in terms of its usability to various situations, such as to various pieces of equipment and to changes in the condition and features of the fleet, on the basis of factual up-to-date information. Achieved at the same time are management, tracking and control of the working process. This is particularly beneficial for an entrepreneur or operator for whom a comprehensive knowledge of the status regarding an entire fleet of forest machines is a key to efficient and profitable operation. The solution makes it possible to avoid for example downtimes resulting from a poor rhythm of work and other nonproductive consumption of time.

BRIEF DESCRIPTION OF THE FIGURES

The invention will now be described more closely in connection with preferred embodiments, with reference to the accompanying drawings, in which.

DETAILED DESCRIPTION

The present solution relates to the management, maintenance and tracking of mobile forest machines and/or transport equipment therefor and reporting the operation thereof. In this disclosure, for the sake of simplicity, the mobile forest machines and/or transport equipment therefor, such as transport machines/vehicles, have been termed as working machine(s) and an entity comprising them as a fleet as long as anything else cannot be concluded based on the context. The solution lends itself particularly well to the control of forest machines and the management of their maintenance, because the machines are typically working in extensive areas far away from service points and possibly also beyond challenging journeys, whereby the working machine may thus comprise a forest machine. Such forest machines include for example harvesters, forwarders, and working machines intended for use as forest machines.

Figure 1:
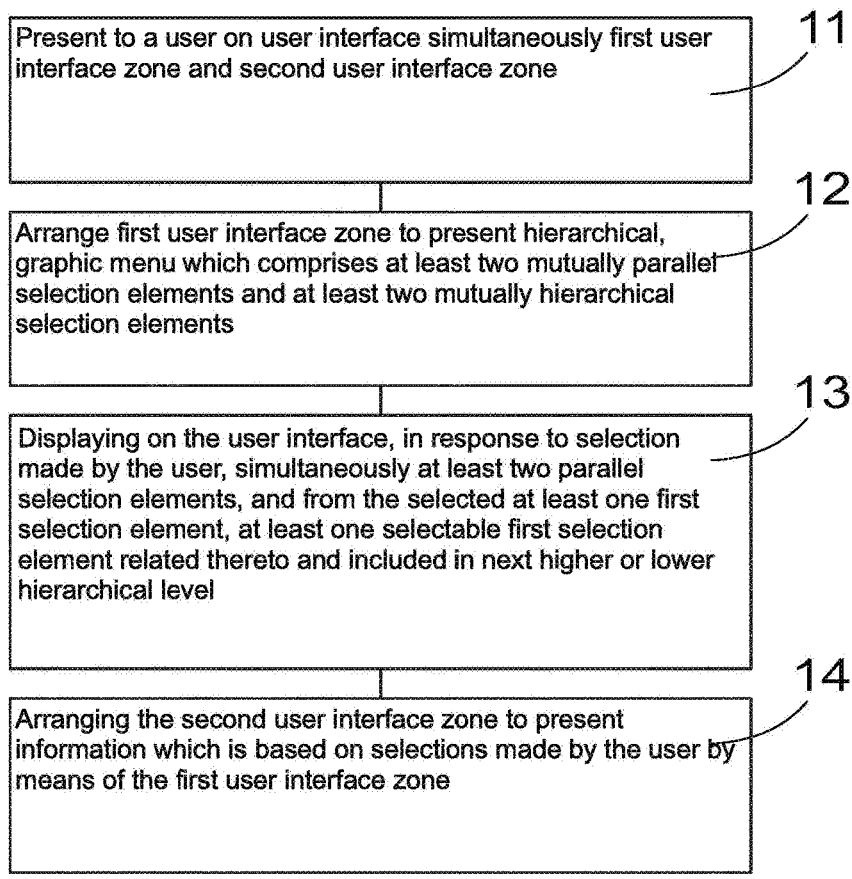
FIG. 1 shows a method of fleet management.
Figure 2:
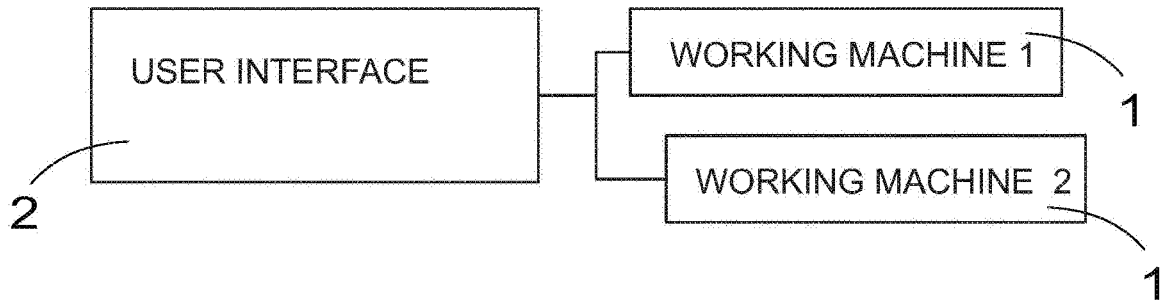
FIG. 2 shows schematically an operating environment and items included therein for the presented method, user interface, computer program and arrangement.
Figure 3:
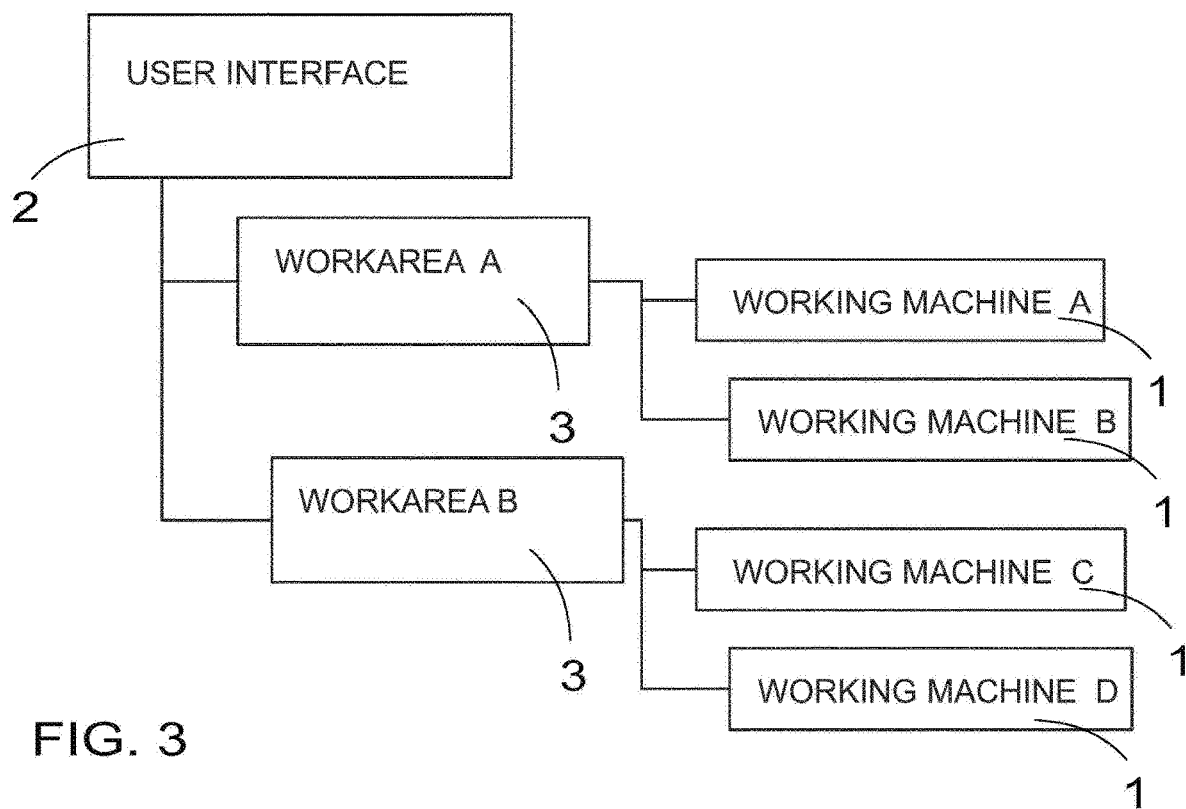
FIG. 3 shows schematically a second operating environment and items included therein for the presented method, user interface, computer program and arrangement.
Figure 4:
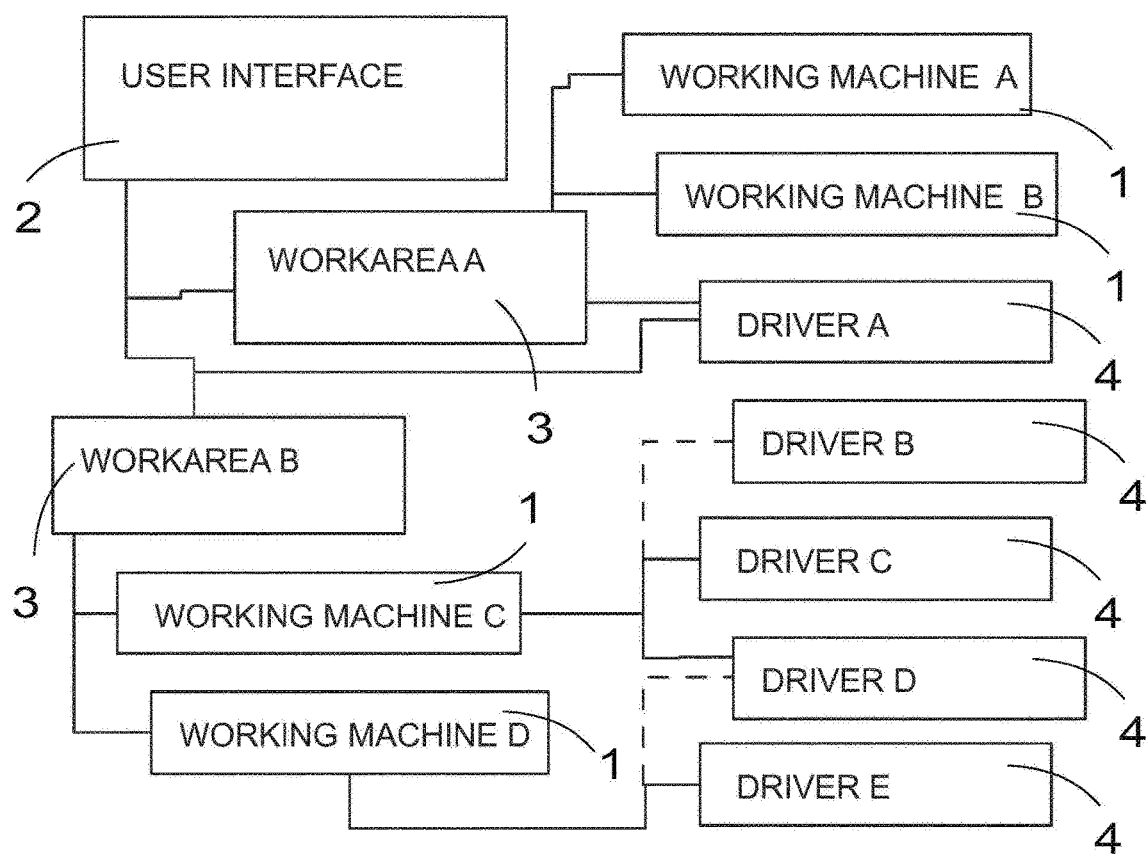
FIG. 4 shows schematically a third operating environment and items included therein for the presented method, user interface, computer program and arrangement.
Figure 5:
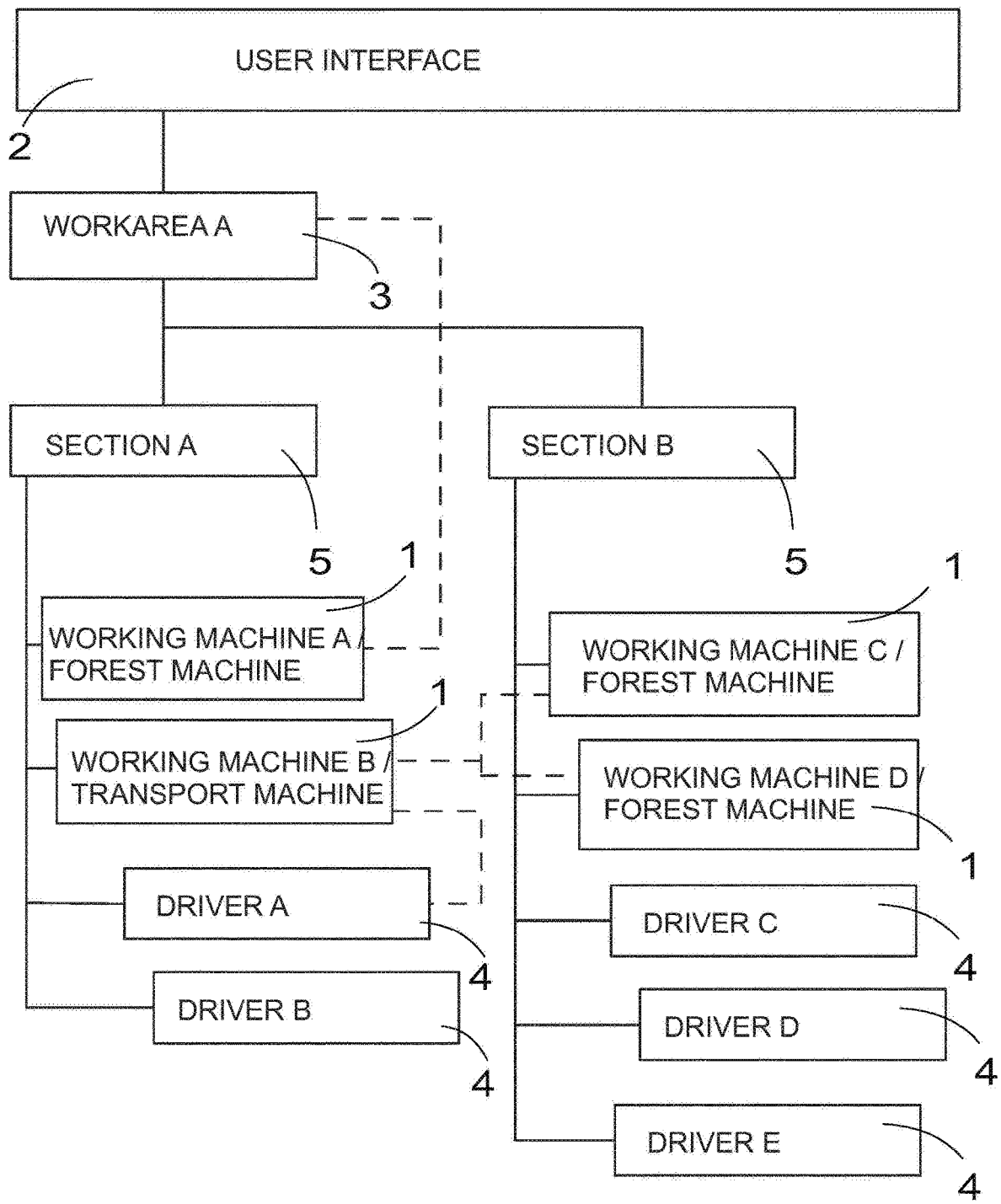
FIG. 5 shows schematically a fourth operating environment and items included therein for the presented method, user interface, computer program and arrangement.

FIG. 1 shows one method of fleet management, in other words mobile forest machines and transport equipment therefor. The fleet may comprise at least two working machines 1, for example forest machines and/or forest machine transport machines/vehicles.

The method may comprise presenting 11 to the user on a first user interface 2 simultaneously a first user interface zone 61 and a second user interface zone 62. The first user interface 2 may comprise a user interface intended for controlling fleet. Hence, the first user interface 2 can be located or locatable at a distance from a working machine 1. Such a first user interface 2 may be provided in a terminal device 12, which is locatable at a distance from the working machine 1, for example in a fixed or portable terminal device, for example in a desktop computer. a portable computer or the like terminal device, which can be located at a distance from each working machine, for example in the entrepreneur's or operator's business premises, or adapted for use in the entrepreneur's or operator's business premises, or in a carry-on terminal device, such as a mobile device, which is operable at a distance from each working machine 1. In other words, what is referred to by the first user interface 2 is a user interface which is not a dedicated user interface for any working machine 1, but intended for managing a fleet of heavy equipment. In one embodiment, the first user interface 2 can nevertheless be presented in the same terminal device with a dedicated user interface of the working machine 1, which is subsequently referred to as a second user interface 7. This can be particularly beneficial should it be necessary to control for example a fleet from a single working machine 1.

The method may comprise arranging 12 the first user interface zone 61 to present a hierarchical, graphic menu, which comprises at least two mutually parallel first selection elements 63 and at least two mutually hierarchical first selection elements 63.

The parallel first selection elements 63 refer to selection elements which represent objects on a common plane in selection hierarchy, i.e. mutually coplanar optional selections. The parallel first selection elements 63 may thus represent for example various workareas 3, various sections 5 in a single workarea 3, various forest machines 1 operating in a workarea and/or in a section thereof, forest machinery transport machines/vehicles or various drivers 4 appointed to work with a working machine in a workarea and/or in a section thereof. On the first user interface 2, depending on the embodiment, such parallel selection elements can be displayed for example side by side on a horizontal level, such as for example the three first selection elements 63 shown on the top line in FIG. 6 or the three first selection elements 63 shown on the bottom line, or one below another in vertical plane, or in some other appropriate and illustrative manner. In the first user interface zone 61, the parallel first selection elements 63 can be preferably presented either side by side or one below another, which improves the hierarchical menu in terms of intelligibility and easy perceptibility. In one embodiment, the second user interface zone 62 is only used for presenting parallel selection elements from one level, whereby the parallel selection elements, for example second selection elements 64 of the second user interface zone 62, can also be presented in some other way, for example as distributed on a map according to locations thereof, depicted in a spiral-like or fan-like manner with respect to the location or in some other appropriate and illustrative manner.

The mutually hierarchical first selection elements 63 refer to first selection elements 63 which stand for objects that are dependent on each other and in a hierarchical or non-planar position relative to each other, i.e. non-planar selections depending on each other upwards or downwards. The hierarchical first selection elements 63 may thus represent for example a workarea 3 and a section 5 thereof, or a working machine 1 or a driver 4 operating in the workarea 3 and/or in a section thereof, and/or a driver appointed to work with a working machine in a workarea and/or a section thereof. On the other hand, the hierarchical first selection elements 63 may represent for example a section and a working machine 1 or a driver 4 working on a section, a working machine 1 and a driver appointed to operate the same or other mutually non-planar selections depending on each other upwards or downwards. Naturally, it is possible that one and the same selection element 63 be parallel with respect to one or more other first selection elements 63 and hierarchical with respect to one or more other selection elements 63.

The method may further comprise displaying 13 on the first user interface 2, in response to a selection made by the user, simultaneously at least two parallel first selection elements 63 and from the selected at least one selection element 63 at least one optional first selection element 63 associated therewith and included in the next higher or lower hierarchical level. The method may still further comprise arranging the second user interface zone 62 to display information based on selections made by the user by means of the first user interface zone 61. Various embodiments for tools and manners by which the user can make a selection will be described more closely for example in the arrangement-related part of the specification.

In one embodiment the information, presented by the second user interface zone 62 and based on selections made by the user by means of the first user interface zone 61, may comprise at least one of the following: sections of a selected workarea, working machines operating in a selected workarea or section, drivers working or appointed to work with working machines in a selected workarea or subarea, a finishing degree of the selected workarea, a finishing degree of the selected section, a finishing degree of the selected section of a workarea, a location of the selected working machine, a route for the selected working machine, a working time of the selected working machine calculated from the time of a previous maintenance procedure and notifications issued by the selected working machine and diagnostic data for the selected working machine regarding the machine's condition/operating mode. The information can be presented in the second user interface zone 62 for example in text mode, in graphical mode, for example as an icon representing the information, a gauge, a dot, an area or a route shown on the map, or as a graph, or as a combination thereof. For example, the finishing degree can be depicted as percentage, a graphical gauge, a progress bar or in some other illustrative manner. In one embodiment, the finishing degree can be presented as a graphical gauge, wherein the selection element has its rim arranged to reflect a finishing degree for example in such a way that the rim segment representing a finishing degree is depicted in a different color and/or in a different thickness than the rest of the rim. The text mode refers also to information presented in numerical form and/or for example acronyms. Preferably, the information presented in the second user interface zone 62 is regularly updated on the basis of data received from objects, such as working machines 1, represented by first selection elements 63 and second selection elements 64. The appropriate regular updating may depend on the type of information. For example, the adequate update frequency for working machines 1 operating in a workarea 3 can be even days, while updating a finishing degree of the workarea 3 or a location of the working machine may be necessary even several times an hour. On the other hand, regarding certain items of information, such as those pertaining to subworkareas 5 of a workarea 3, it may be sufficient that the information be updated as subworkareas are started/added and as subworkareas are finished. The information may also be based on selections made by the user, for example such that when the user acts on at least one first selection element 63 of the first user interface zone 63, the object represented by this first selection element 63 will be displayed in the second user interface zone 62 or, with regard to said object, there will be displayed different information or new information, or information related thereto will be updated in the second user interface zone 62. Hence, the information presented by the first user interface zone 61 and/or the second user interface zone 62 can be updated regularly and/or in response to selections made by the user on the first user interface 2 or on the second user interface 7. In addition to or instead of an update that is regular and/or based on the user's selections, the information presented by the first user interface zone 61 and/or by the second user interface zone 62 can also be updated in response to changes in fleet as subsequently described in more detail.

In one embodiment, the first user interface zone 61 may comprise at least one third selection element 65 representing information type related to the first selection elements, a gauge or other further information. The third selection element 65 can be presented in the first user interface zone 61 every time the first user interface zone 61 is displayed on the first user interface 2 or only in response to the user affecting such a first selection element 63 which represents an object that the further information represented by the third selection element may be related to. Accordingly, as the user is affecting the first selection element 63 and the third selection element 65 in the first user interface zone 61, the second user interface zone 62 can be arranged to display at least further information represented by the user-selected third selection element 65 regarding at least an object represented by the user-selected first selection element 63. For example, the user may then choose in the first user interface zone 61 a working machine A with the first selection element 63 and maintenance notifications with the third selection element 65, whereby the second user interface zone 62 can be arranged to display this particular working machine and maintenance notifications, maintenance data, condition data and/or condition reports related thereto. The maintenance data related to a working machine may comprise for example information about at least one or more most recent maintenance sessions of the working machine, for example the point in time of such maintenance and/or at least one maintenance procedure. The maintenance notifications concerning a working machine may comprise for example a message expressing the maintenance demand recognized by the machine or the driver or a notification about the approach of a maintenance demand based on a recommended maintenance interval. The maintenance interval can be based on time or based on the operation of a working machine, for example on operating hours or the amount of handled material. The condition data for a working machine may comprise for example information about a degree of wear for at least one structural component of the working machine, a service life or measuring result expressing a condition of the working machine. The condition report of a working machine may comprise for example a message about the demand to replace a wear part of the working machine or about the approach of such a replacement demand. The replacement demand may be based for example on a measuring result indicating the wear, service life, operating time or condition of a working machine or its structural component.

In one embodiment, the user is able to make selections by means of at least one third selection element 65 without affecting the first selection elements 63. In this case, the user may for example select in the first user interface zone 61 a finishing degree with the third selection element 65, whereby the second user interface zone 62 can be arranged to display finishing degrees for workareas or subworkareas presented by the second user interface zone 62, for example by a map view shown in the second user interface zone 62. On the other hand, should the user further select an workarea A with the first selection element 63, the second user interface zone 62 can be arranged to display the discussed workarea and its finishing degree or further information from a combination selected with the first and third selection elements 63, 65, such as finishing degree information more accurate than on other workareas.

In one embodiment, the second user interface zone 62 can be arranged to display a map view. This map view can be a map view tailored for the second user interface zone 62 or it can be based on a commercial map service or on another map view offered by an external service provider. Hence, the information displayed in the second user interface zone 62 may comprise for example a dot, an area or a route presented on such a map.

The second user interface zone 62 may be further arranged to display at least one second selection element 64. The second selection element 64 may represent the same object as one of the first selection elements 63 of the first user interface zone, or an object in a hierarchical relationship with respect to the object represented by this first selection element 63, or information or functions associated with these objects. This information may comprise at one of the following: a route traveled by at least one object as presented on a topographic base, production data of at least one object, production outputs of at least one object, a point in time for at least one accomplished transit of at least one object, a notification about at least one transit demand for at least one object, at least one maintenance notification for at least one object regarding at least one accomplished maintenance, at least one maintenance notification for at least one object regarding at least one scheduled maintenance, at least one maintenance notification for at least one object regarding at least one required maintenance, at least one piece of diagnostic information and the quality of a communications link to at least one object. Respectively, the functions may comprise at least one of the following: creating remote communication to a working machine for reviewing the machine data, creating remote communication to a working machine for managing and/or adjusting the machine, creating remote communication to a working machine for establishing a voice communication link to the machine, and creating remote communication to a working machine for providing the discussed working machine with navigation instructions in a map application. The navigation instructions may comprise for example guiding a forest machine to a pickup point accessible for a transport machine or vehicle and/or guiding a transport machine or vehicle to the location of or as close as possible to a forest machine. The information about maintenance, transit and other such demands can be based for example on a report delivered by a working machine operator, on a demand or prediction, which is identified by the diagnostics of a working machine, for example by the working machine's control system, and which may be based for example on the maintenance interval, the expected service life or operating period, the finishing degree and/or finishing degree changing rate of a working machine or a structural component thereof and/or on the degree of wear and/or degree of wear changing rate of a working machine or a structural component thereof.

Figure 9A:
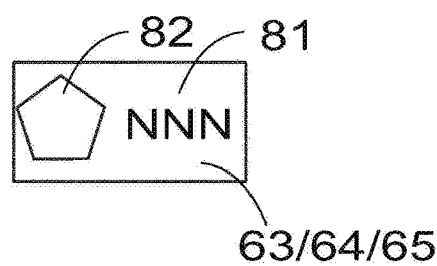
FIGS. 9a and 9b show schematically a few selection elements.
Figure 9B:
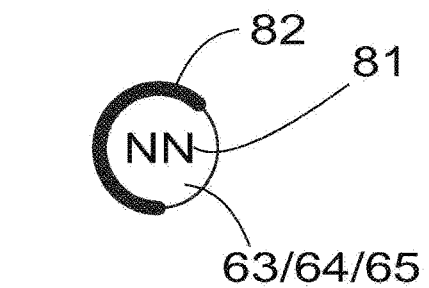

In one embodiment, the first selection elements 63, the second selection elements 64 and/or the third selection elements 65 may comprise both a selection-indicating text portion 81 and a graphical portion 82. FIGS. 9a and 9b illustrate schematically a few such selection elements, which may thus comprise first selection elements 63, second selection elements 64 or third selection elements 65. The text portion 81 is deemed to also comprise data presented in numerical form or, for example, with generally known mathematical symbols. The graphical portion 82 may comprise data presented for example with graphical representation, such as an icon, with an appearance, such as coloring, line weights, shadowings, a degree of brightness or other such appearance factors, a gauge, lines, areas, bars or other shapes. The text portion and the graphical portion may present data which is the same for both or mutually different. For example, the finishing degree can be presented both in numerical form and as a gauge, or the text portion may comprise for example a symbol for the working area or section and the finishing degree for a working area or section can be presented as a graphical gauge. Respectively, the text portion may comprise for example a machine insignia and the graphical portion a basic machine type, whereby, for example for the harvester, forwarders and separate grapple measuring devices, could have been chosen specific graphical icons, enabling the user to readily and quickly recognize for example machine types operating in a workarea. In FIG. 9a, the graphical portion 82 comprises a figure, which can be for example an icon representing the type of working machine 1, workarea or section, or a finishing degree-representing graphical gauge which may depict the finishing degree as a circular sector. The text portion 81 may respectively depict for example an insignia for the working machine, a condition of the working machine or a measuring result related thereto, a finishing degree in percentage, a type of workarea or section as a writing or acronym, or some other feature, measurement value or data associated with an object or information represented by the selection element. In FIG. 9b, the text portion 81 may comprise for example a symbol for the working machine 1, the workarea 3 or section 5, and the graphical portion 82 may comprise measurement data pertinent thereto, for example a finishing degree, a degree of wear of the working machine or a structural component thereof, or a time elapsed from the time of a previous maintenance procedure with respect to a scheduled maintenance interval as displayed by a line weight. In one embodiment, the first selection element 63, the second selection element 64 and/or the third selection element 65 may comprise at least two graphical portions 82 and/or text portions 81. In this case, one graphical portion 82 may comprise for example an appearance factor and the other graphical portion 82 may comprise for example a graphical figure such as an icon or a graphical gauge.

In one embodiment, the text portion or the graphical portion of at least the first selection element 63 and/or the second selection element 64 can be arranged to display information pertinent to an object, which is represented by each first selection element 63 and/or second selection element 64, received from said object or from an object linked directly or indirectly thereto, describing the object represented by the first selection element. The information presented by the first selection element 63 may comprise for example computational data depicting an object represented by the first selection element 63 or measurement data. The linked object refers for example to forest machines, transport machines and/or drivers associated with a workarea represented by the first selection element, for example those in active service in the workarea, or respectively for example to drivers associated with a working machine represented by the selection element and appointed for example to operate the working machine.

In one embodiment, the second user interface zone 62 may comprise at least one said second selection element 64. This second selection element 64 can be arranged to display more precise information about an object, for example a working machine, or to execute at least one function for fleet management. Such a function may comprise at least one of the following: creating remote communication to a working machine and particularly to the control system of a working machine, creating a voice link or instant messaging service to a working machine, establishing a voice link to a selected telephone number, such as to the driver, initiating a map application for navigating to a particular working machine, displaying a route traveled by a working machine and/or a transport machine, presenting at least one item of production data or consumption data for a working machine or at least one characteristic calculable therefrom, presenting at least one past point in time for a transit and at least one future point in time for a transit. Thus, at least one of the functions described here or elsewhere in this disclosure can be conducted in response to the user affecting a second selection element 64 representing the function or associated with the function.

The creation of a remote communication link 10 to an object by means of the first user interface 2 may thus enable taking control of a working machine, such as a forest machine or a forest machine transport machine, or affecting the same with a terminal device 12 in which the first user interface is provided. The terminal device, in which the first user interface 2 is provided, may comprise a first control unit 8. The working machine 1, such as a forest machine or a forest machine transport machine or vehicle, may comprise a second control unit 9. The second control unit may comprise a second memory 11 for storing information and instructions relating for example to the working machine 1 and/or received from the first control unit 8. The first control unit 8 can be arranged to establish a remote communication 10 to the working machine 1, for example to the working machine's 1 control unit, i.e. to the second control unit 9. Hence, this enables a communication link to be created from the terminal device 12 to the working machine's 1 control unit, or to a control unit for taking control of the working machine 1, over the first user interface 2, i.e. a user interface set up at a distance from the working machine 1. The remote communication can be preferably established over a remote communication server, such as Real/VNC, in a per se known manner.

Figure 6:
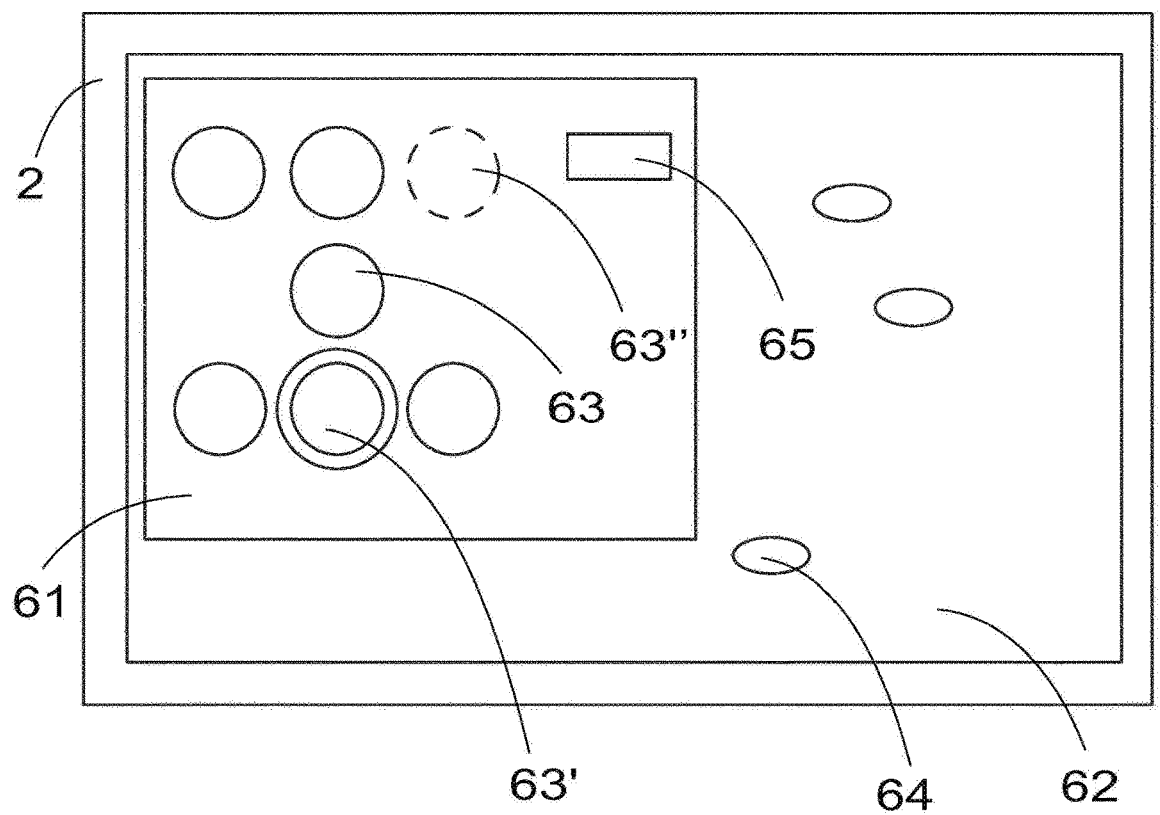
FIG. 6 shows schematically one user interface and one view thereon for fleet management.

By means of said remote communication, it is for example possible to review and assume control of the user interface of a working machine's inherent control system, i.e. the second user interface 7, for example as it appears in the working machine. In other words, the screen of a manageable working machine's 1 control system can be seen on the display of a terminal device 12 or a computer disposed at a distance from the working machine 1, such as the terminal device 12 of an operator or entrepreneur. This enables a review and management for example of the machine's diagnostic information as well as a change of setups, such as for example hydraulic pressure values, temperatures of the machine's components, liquid levels, condition of filters, working cycles of the engine, alarms, reports given by the system. In one embodiment, the selected first selection elements 63 can be defined to have an appearance which is different from that of the selectable first selection elements 63. In FIG. 6, this has been illustrated by depicting a first selection element 63' with a double line, but the exceptional appearance can also be presented in any other per se known manner, such as by coloring, line weights, shadowings, degree of brightness, size, size ratio or other suchlike appearance factors, or by combinations of the above.

In one embodiment, at least one first non-selectable selection element 63 can be defined to have an appearance which is different from that of the selected and, on the other hand, selectable first selection elements 63. In FIG. 6, this has been illustrated with a double line for a first selection element 63", but the exceptional appearance can also be presented in any other per se known manner as described above. Depending on the operating status and embodiment, the fact that the first selection element 63 is not selectable may result from other selections, or for example from not being able to establish a communication link to an object represented by this particular first selection element 63, or from a combination thereof, for example from not receiving necessary information from the discussed object, for example information selected with a third selection element 65.

In one embodiment, the first user interface 2 can be arranged to update the second user interface zone 62 with further information, which is based on selections made by a user by means of the first user interface zone 61, in response to the user affecting the same first selection element 63 again. In other words, as the user acts for example on a first selection element 63 for the first time, the second user interface zone 62 can be arranged to display an object represented by the selected first selection element 63 or information pertaining to this object or to change or update a displayable object represented by the first selection element 63 or information pertaining to this object. When the user, after this, acts on the same first selection element 63, the user interface can be arranged to change or update a displayable object represented by the first selection element 63 or information pertaining to this object with respect to a status presented by the first selection. Affecting the same first selection element 63 in the first user interface zone 61 may for example supply the second user interface zone 62 with further information or information other than that obtained by the first action on this particular first selection element 63. The updating may proceed for example in such a way that the first user interface 2 transmits to an object represented by the first selection element 63, or to an object hierarchically related thereto, a request to update the information, the object transmits the updated information to the first user interface 2, the first user interface 2 receives the information and updates the information displayed in the second user interface zone 62 to comply with the updated information. A similar functionality can also be implemented for further information represented by a third selection element 65, the first user interface 2 being arrangeable to update the second user interface zone 62 with further information, which is based on selections made by a user by means of the first user interface zone 61, in response to the user affecting the same third selection element 65 again.

In one embodiment, at least one of the following can be updated to comply with a fleet status in response to changes in fleet, such as the change of location and workarea or working phase, on the basis of information transmitted by at least one working machine operating in the area and included in the fleet: a first selection element displayed in the first user interface zone, a number of the first selection elements displayed in the first user interface zone, a text portion of the first selection element displayed in the first user interface zone and a graphical portion of the first selection element displayed in the first user interface zone. In addition to or instead of this, it is possible in a second embodiment to update at least one of the following to comply with a fleet status in response to changes in fleet, such as the change of location and workarea or working phase, on the basis of information transmitted by at least one working machine operating in the area and included in the fleet: a second selection element displayed in the second user interface zone, a number of the second selection elements displayed in the second user interface zone, a text portion of the second selection element displayed in the second user interface zone and a graphical portion of the second selection element displayed in the second user interface zone. In a third embodiment, such an update can be conducted regularly as described above. In other words, the information presented by the first user interface zone 61 and by the second user interface zone 62 can also be preferably updated without the user's participation in the matter for example by affecting the selection elements. This is particularly beneficial because, in this case, for example a default view displayed in the second user interface zone 62 and a hierarchical graphic menu displayed in the first user interface 61 always present up-to-date data. Hence, the default view and the menu can be referred to as dynamical. This may enable status surveillance on basic level without affecting the user interface and the selections made by the menu being based on the actual situation. Thereby is avoided an oft-recurring problem of static menus, which is due to the user making incompatible selections for example by selecting in combination a workarea and a working machine, the latter operating at the moment of selection in a different workarea, whereby the selection combination's information may be false or at least misleading.

In one embodiment, the object represented by a first selection element 63 or a second selection element 64, or the object related hierarchically thereto, to which a request is transmitted for updating the information for the first user interface 2, or which is arranged to supply the first user interface 2 with information either regularly or in response to changes in fleet, may comprise the second user interface 7 which may comprise a dedicated user interface for this object. This second user interface 7 can be arranged to present information consistent with that displayed by the first user interface 2 and/or a notification about information transmitted to/updated for the first user interface 2.

In one embodiment, at least some of the first selection elements 63 and/or the second selection elements 64 have been linked to at least a single operator's working machines in a workarea, to working areas, to cutting areas and/or to drivers of the working machines.

In one embodiment, at least one first selection element 63 and/or second selection element 64 may represent an object, said object comprising at least one of the following: a forest machine, a transport machine/vehicle for the forest machine, a workarea, a section and a driver.

In FIGS. 2-5 are schematically presented various working environments, and objects included therein, for a method, user interface, computer program and/or arrangement intended for the management of described fleet, especially forest machines and transport equipment therefor. The fleet may comprise at least two working machines 1, which can be forest machines and/or transport machines/vehicles for forest machines. The method and arrangement enable the use of a user interface 2, processing means 91, such as a computer which may comprise for example a first control unit, and/or a computer program product, for fleet management. FIGS. 2-5 show specifically also objects, which can be represented by the first selection elements 62 and/or the second selection elements 63, and various ways for these objects of becoming linked to each other either directly or indirectly. The dashed lines represent a few possible ways according to a few further embodiments, whereby the objects, such as working machines 1, workareas 3, drivers 4 and sections 5, may be linked to each other. In this case, there are also two different ways for two objects to be linked to each other: directly and by way of a third object placing itself between the objects in hierarchy. On the other hand, an object may also be linked to two separate hierarchies, for example a transport machine may serve two or more workareas 3 or sections 5. The user interface 2 may comprise a user interface 2 consistent with any embodiment presented in this disclosure, and the user interface 2 and the arrangement can be arranged to carry out at least some of the method steps and features consistent with a method presented in this disclosure.

Figure 10:
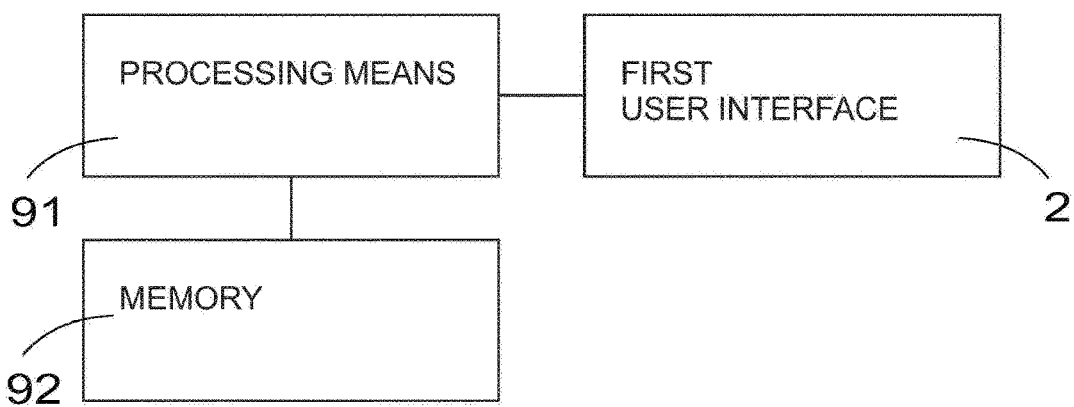
FIG. 10 shows schematically one arrangement for fleet management.

In one embodiment, the arrangement for fleet management, said fleet comprising at least two working machines, may comprise at least a first memory 91 for saving the information related to the first user interface 2 and to objects represented by the first selection elements 63 and the second selection elements 64, processing means 92 by which can be executed at least some of the method steps of a method described in this disclosure, and any first user interface 2 presented in this disclosure. FIG. 10 shows schematically one such arrangement. In one embodiment, the arrangement for fleet management is set up at a distance from each working machine 1, for example in the operator's or entrepreneur's premises. The arrangement can be set up in its entirety or partially at a distance as mentioned above from the working machine 1, for example in a terminal device mounted or mountable in the entrepreneur's or operator's business premises or in a portable terminal device.

In one embodiment, the arrangement for managing fleet, such as forest machines and transport equipment therefor, may comprise processing means 91. The processing means 91 can be arranged to perform at least some of the method steps and/or features presented in this disclosure. The processing means 91 can also be arranged to establish a remote communication link between the first user interface 2 and the second user interface 7. In one embodiment, the processing means 91 can be arranged to transmit information and instructions, for example information updating requests, to the working machine 1, for example to a second control unit 9 in the working machine 1. In one embodiment, the processing means can be arranged to receive information from another control unit. In still another embodiment, the processing means 91 can be set up at a distance as described above from the working machines 1, for example in a terminal device mounted or mountable in the entrepreneur's or operator's business premises or in a portable terminal device. The processing means 91 may comprise for example a programmable logic and/or a programmable microprocessor. The processing means 91 may constitute a first control unit or a part thereof.

Still further, the arrangement shown in FIG. 10 comprises a memory 92 for storing information related to the first user interface zone 61, the second user interface zone 62, the first selection elements 63, the second selection elements 64 and the third selection elements 65, as well as to objects represented by these selection elements 63, 64 and 65. Such information and objects are described more precisely in relation to the method and the user interface. The first user interface 2 may comprise for example a display and/or various selection elements, such as buttons, a mouse, a joystick and/or a touch screen, by means of which the user can apply inputs into the information system.

Figure 11:
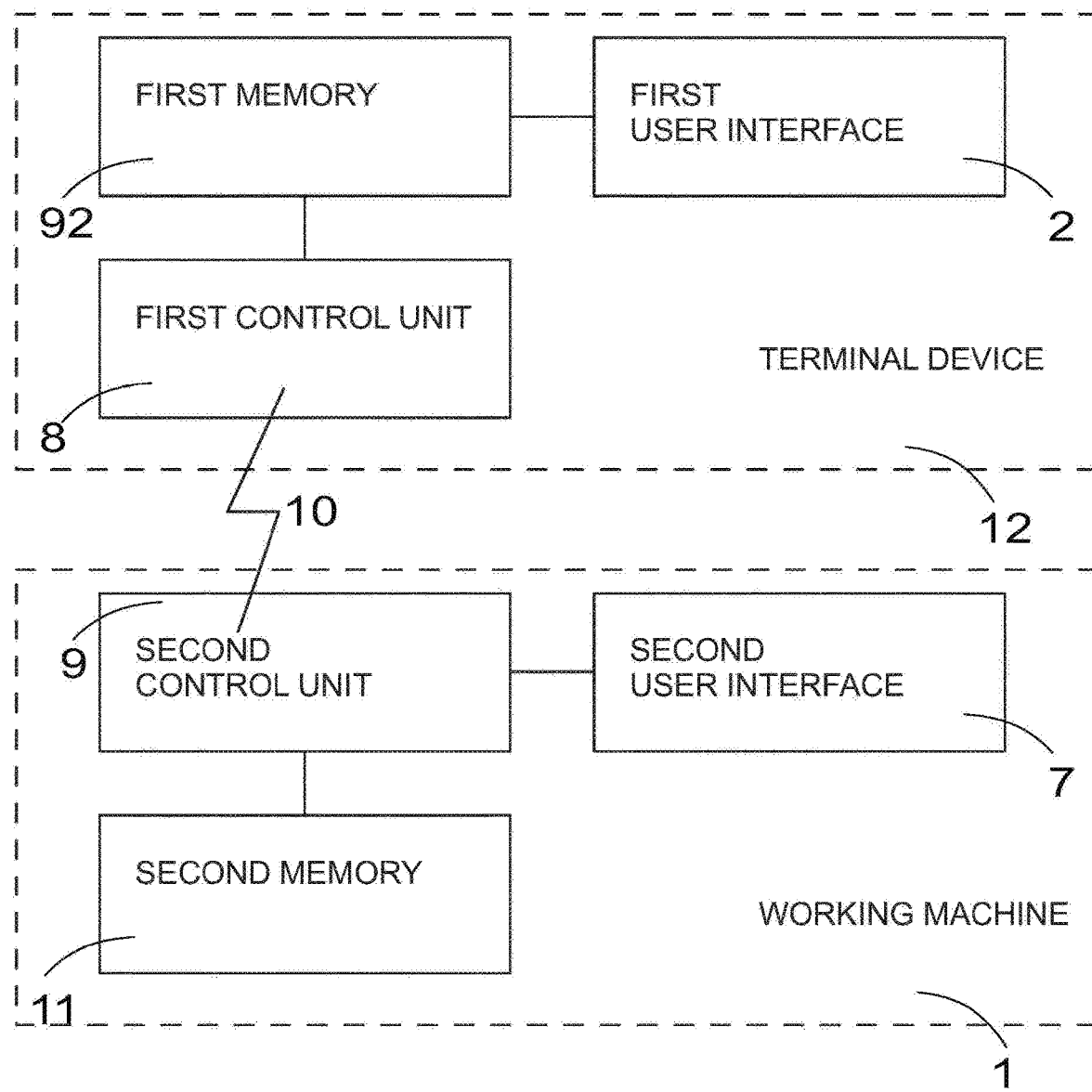
FIG. 11 shows schematically another arrangement for fleet management.

In FIG. 11 is shown one second arrangement for managing fleet, wherein the processing means 91 comprise a first control unit 8 and said arrangement further comprising a second control unit 9 provided on the working machine 1, a second user interface 7 and a second memory 11. In other respects, the arrangement can be consistent with that shown in connection with FIG. 10.

In one embodiment, the computer program product can be in storage on a computer readable medium and capable of being executed with a processor, and the computer program product may comprise a computer readable program code. Such a computer program product can be arranged to carry out at least some of the steps of a method as presented above as the program code is being executed with a processor.

In one embodiment, it is possible for a user of the first user interface 2 and/or the arrangement, such as for an entrepreneur or operator, to select by means of the first user interface 2, for example by means of the first selection element 63 or the second selection element 64, a working machine 1 present in a specific workarea and to review the working machine's 1 information for example by deploying the first selection elements 63, the second selection elements 64 and/or the third selection elements 65. In one embodiment, it is further possible for a user, if necessary, to establish by means of the first user interface 2 a remote communication link to the selected working machine 1 for taking control of the working machine's control system. Thus, in this case, the first user interface 2 can be arranged to establish a remote communication link to a second control unit 9 in the working machine 1 for performing any of the functions described in this disclosure for managing fleet, and to transmit and receive information and commands between the first control unit 8 and the second control unit 9 for carrying out these functions.

In one embodiment, the working machine may comprise communications equipment for creating a communication link and for communicating information by making use of a satellite connection or other communication link. Such communications equipment necessary for creating a remote connection may comprise any per se known communications equipment which enables information and commands to be transmitted between the first control unit 8 and the second control unit 9. Such wireless communication links are known as such, and thus not described here in more detail. In one embodiment, the working machine may comprise satellite positioning equipment for locating the machine.

In FIG. 6 is shown schematically one user interface and one view thereof for managing fleet. The fleet may comprise at least two working machines 1. The user interface 2 presented herein, or at least some embodiment thereof, may constitute a part of the arrangement for managing fleet and/or be arranged to execute at least some of the method steps of a method as described in this disclosure for managing fleet. Several features of the user interface 2 are also described in connection with the above-presented method and arrangement.

As pointed out above, the user interface 2 may comprise several first selection elements 63 selectable for a user by affecting at least one of said first selection elements 63. The user interface 2 may also comprise a first user interface zone 61 and a second user interface zone 62, said first user interface zone and second user interface zone being presentable to a user simultaneously on the same user interface 2. The first user interface zone 61 can be arranged to display a hierarchical graphic menu, which comprises at least two mutually parallel first selection elements 63 and at least two mutually hierarchical first selection elements 63. The user interface 2 can be arranged to display, in response to a selection made by the user, simultaneously at least two parallel first selection elements 63, and by the selected at least one first selection element 63, at least one optional first selection element 63 associated therewith and included in the next higher or lower hierarchical level. The second user interface zone 62 can be arranged to display information which is based on selections made by a user by means of the first user interface zone 61. Several of these features and embodiments thereof have been described more precisely above in connection with the method.

In one embodiment, the first user interface zone 61 and the second user interface zone 62 can be shown simultaneously whenever the first user interface zone 61 and the second user interface zone 62 are displayed. In another embodiment, the first user interface zone 61 and the second user interface zone 62 can only be shown simultaneously in certain operating conditions. In one embodiment, the first user interface zone 61 can be shown in response to a user having affected the second user interface zone 62, for example by making a selection in the second user interface zone 62.

Figure 7:
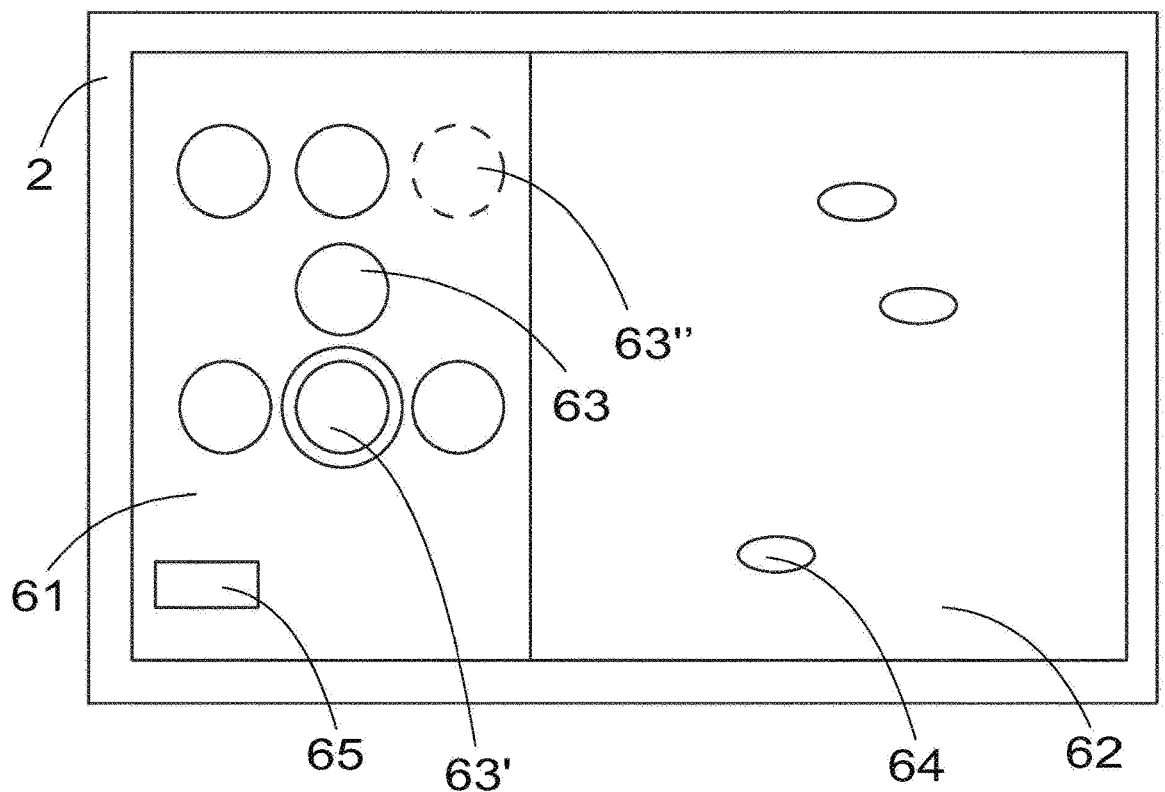
FIG. 7 shows schematically a second user interface view for fleet management.

In one embodiment, the first user interface zone 61 can be disposed partially or completely on top of the second user interface zone 62, so as to cover at least a part of the second user interface zone 62. In another embodiment, the first user interface zone 61 and the second user interface zone 62 can be disposed side by side, one below the other, or otherwise such that both user interface zones 61, 62 are completely visible also when the first user interface zone 61 and the second user interface zone 62 are shown simultaneously. FIG. 7, for example, shows schematically another user interface view for managing fleet, wherein the first user interface zone 61 and the second user interface zone 62 are disposed side by side.

Figure 8A:
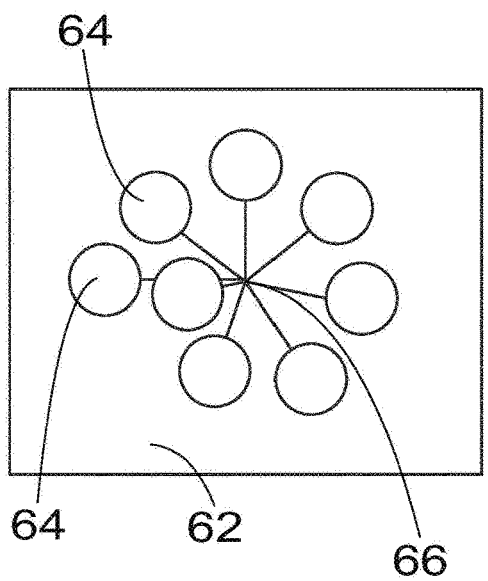
FIGS. 8a and 8b show schematically a few details of one second user interface zone.
Figure 8B:
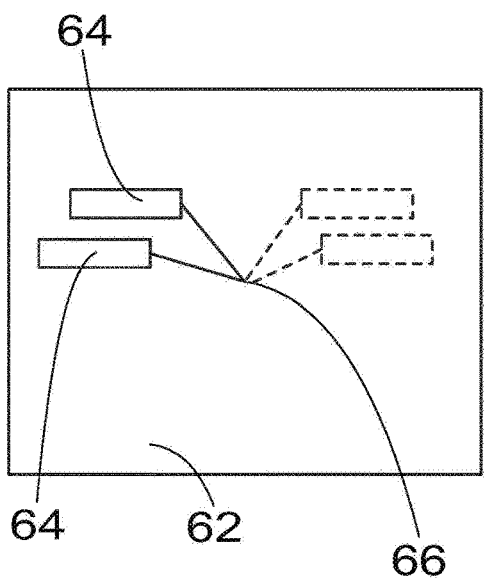

FIGS. 8*a* and 8*b* show schematically a few details about one second user interface zone. The preferably parallel selection elements, for example the second selection elements 64 of the second user interface zone 62 as in FIGS. 8*a* and 8*b*, can be disposed so as to shield as little as possible other essential, possibly updating information and/or view presented in the user interface zone. In FIG. 8*a*, the parallel second selection elements 64 of the second user interface zone 62 are displayed in the user interface zone for example distributed on a map according to the locations thereof, illustrated in a spiral- or fan-like manner with respect to a user interface point 66, for example a location on the map. In FIG. 8*b*, the parallel second selection elements 64 of the second user interface zone 62 are displayed in the user interface zone for example distributed on a map according to the locations thereof in the form of bars disposed one below another in one or two columns. Alternatively, it is also possible to employ some other appropriate and demonstrative mode of presentation, for example a circumferential sequence. In one embodiment, the presentation mode for parallel second selection elements 64 in the second user interface zone can also be chosen dynamically, based for example on the number of second selection elements 64, on other information and its amount to be presented in the second user interface zone 62, and/or on whether or not the first user interface zone 61 is visible at this particular moment.

In one embodiment, the method, arrangement, computer program and user interface can be used for managing carriage traffic. The transport machines/vehicles for forest machines may comprise what is referred to as such a carriage. The method, arrangement, computer program and user interface can be employed for managing transports of these carriages and forest machines to workareas and away from there to the next workarea or to maintenance or storage. Hence, it is by means of the first user interface 2 and/or the first control unit 8 that the transport demands of carriages and transportable forest machines can be identified, such that the carriage and the transportable forest machine can be guided to a pickup point at the correct time. Thus, the first control unit 8 is able to identify a demand to pick up at least one forest machine for example as the finishing degree of a workarea 3 or a section 5 reaches a predetermined threshold value. Moreover, the first control unit 8 may identify the closest available or to-be-available carriage or other transport machine/vehicle for example on the basis of a message from the transport machine's/vehicle's driver or a planned traveling route and location of the transport machine/vehicle. In other words, the method, arrangement, computer program and user interface can be used for managing the logistics of forest machines and carriages or other transport machines/vehicles for example for choosing carriages and transportable objects, for scheduling transports, for selecting routes, and for calling transport machines/vehicles and forest machines at an agreed moment for example with some previously described method or function for example by means of the first user interface 2 and/or the second user interface 7.

In one embodiment, the method, arrangement, computer program product and user interface can be used for monitoring maintenance demands for a working machine, specifically a forest machine. The surveillance of a forest machine's maintenance demand may comprise for example scheduled maintenance services, malfunctions, failures, and observation of a need to replace components before failure. Thus, the method, arrangement, computer program product and user interface can be used for monitoring such a maintenance demand and to the forest machine can be transmitted a notification about necessary maintenance. In one embodiment, the notification about necessary maintenance can be displayed on the first user interface 2 at a distance from working machines and/or on the second user interface 7 in the working machine 1. This enables a centralized surveillance of the maintenance demand for machines, whereby the first control unit 8 and/or the processing means 91 may for example transmit to a forest machine transport machine/vehicle an invitation to fetch the forest machine in need of maintenance to a service point or send to a forest machine maintenance person an invitation to arrive in order to carry out the maintenance procedures on the forest machine. The invitation may also comprise at least one of the following: a phone number for the forest machine's driver, a link for establishing a voice communication with the forest machine, navigation instructions to the forest machine's location, and/or a suggestion for maintenance time or pickup time. Respectively, it is possible to transmit to a forest machine, for example to the second user interface 7, a notification about necessary maintenance and/or information for example about a point in time, a pickup location, and/or navigation instructions for a pickup location for fetching the forest machine to maintenance.

In one embodiment, the method, arrangement, computer program product and user interface can be used for monitoring workareas. The surveillance of workareas may comprise at least one of the following pieces of information: finishing percentage, working machines within the workarea, drivers operating within the workarea and/or their detailed productivity data individually or in comparison.

In one embodiment, the method, arrangement, computer program product and user interface can be used for the diagnostics of working machines. Hence, the method, arrangement, computer program product and user interface can be used for diagnosing the condition of and maintenance demand for the systems of a working machine's components and for monitoring the condition. To the forest machine can for example be transmitted a message about diagnosed deterioration or failure. In one embodiment, the information about a working machine's condition can be displayed on the first user interface 2 at a distance from working machines and/or on the second user interface 7 in the working machine 1. This enables a centralized condition monitoring for machines, whereby the first control unit 8 and/or the processing means 91 may for example transmit to a forest machine transport machine/vehicle an invitation to fetch a forest machine in need of maintenance to a service point or may send an invitation to a maintenance person to arrive in order to carry out maintenance on the forest machine. The invitation may also comprise at least one of the following: a phone number for the forest machine's driver, a link for establishing a voice communication with the forest machine, navigation instructions to the forest machine's location, and/or a suggestion for maintenance time or pickup time. Respectively, it is possible to transmit to a forest machine, for example to the second user interface 7, a notification about necessary maintenance and/or information for example about a point in time, a pickup location, and/or navigation instructions for a pickup location for fetching the forest machine to maintenance.

In one embodiment, the method, arrangement, computer program product and user interface can be used for establishing a remote communication to a working machine and for managing the working machine by means of the remote communication. Hence, the computer program product, the first control unit 8 and/or the processing means 91 can be used for establishing remote communication with the machine's control system and taking control of the second user interface 7 and/or the second control unit 9. This now enables for example an adjustment of machine setups for example in response to a message about the working machine's maintenance demand or a message about the working machine's condition received by the first control unit 8 and/or by the processing means 9 and/or for updating software of the second user interface 7. The remote communication can be established in some technology and manner known as such, by making use for example of GSM, GPRS, EDGE, 3G and/or 4G technology or the like mobile communication network technology or, if necessary, with the absence of such networks, for example by way of a satellite link or some other currently employed wireless connection. Hence, each working machine and each terminal device disposed at a distance from the working machine or to be carried along are each time provided with a transmitter and a receiver for transmitting and receiving information for example between the first control unit 8 and the second control unit 9 and/or the first user interface 2 and the second control unit 9.

In one embodiment, the method, arrangement, computer program product and user interface can be used for monitoring and managing a working machine's efficiency and/or productivity. Such information may comprise for example information disclosed in the publication WO2016030576. Thus, such information can be presented both to the driver in a working machine and to the operator or entrepreneur on his/her terminal device 12 at a distance from the working machine.

In one embodiment, the information to be processed and/or presented may comprise output information (PRD).

In one embodiment, the information to be processed and/or presented may comprise time tracking information (DRF). The time tracking information may comprise at least one of the following: real time surveillance of a harvester and driver in terms of at least one characteristic, monitoring the location of a machine, monitoring the driver and monitoring the workarea.

In one embodiment, in at least one view of the first user interface 2, the information obtained from a working machine by means of a remote connection/communications link and to be presented on the first user interface 2 may comprise at least one or more of the following pieces of information regarding for example forest machine equipment: Classic StanforD: PRD—harvester's output information, DRF—time tracking information, KTR—calibration reports, and StanForD2010: HPR—harvester's output information, FPR—forwarder's output information, MOM—time tracking information, HQC—calibration reports, as well as Ponsse Ecodrive Harvester ja Ponsse Ecodrive Forwarder—reports on the characteristics.

In one embodiment, the information to be processed and/or presented may comprise a route traveled by a machine displayed on a map. The map may comprise for example a per se known commercial map and/or navigation application or a map/atlas provided by some other map service. In this case, the rout can be presented as a separate data layer on top of a map provided by the map service.

In one embodiment, the information to be processed and/or presented may comprise information related to the control of carriages. In one embodiment, the driver of a working machine may order a carriage for transporting the working machine at a point in time appropriate from the standpoint of work.

In one embodiment, the information to be processed and/or presented may comprise information related to determining the maintenance demand for working machines, such as maintenance demand notes, maintenance history data tracking information and/or maintenance interval tracking information.

In one embodiment, the information to be processed and/or presented may comprise an amount of timber varieties and/or an ongoing workarea or section, for example an area stand marked for harvesting. In one embodiment, the driver may input at the outset of a workarea or section, i.e. upon commencing the work in a workarea or section, an assessment to which the percentage-wise cutting amount is compared. Thus, in a management system, especially in the first memory 92, can be stored information about the location, assessments and realizations of working machines included in fleet. Hence, the operation chaining for machines, for example harvesters and forwarders, can be planned on the basis of this information. Thus, tracking the location and assessments of working machines may assist in planning the chained operations for the machines. The second control unit 9 can for example transmit information to the first control unit 8, for example an assessment about the cutting amount for a workarea or section. This can happen for example in response to the driver inputting this information by using the second user interface 7. The first control unit 8 may receive this information and update the first user interface zone 61 and/or the second user interface zone 62, for example the first selection elements 63, the second selection elements 64 or the third selection elements 65 or information pertinent thereto, in response to receiving the information. In one embodiment, the first control unit 8 may further define functions described in this disclosure in response to receiving the information. Still further, the first control unit 8 can be arranged to update the first user interface 2 and/or to transmit information and/or to establish a remote connection for at least one second user interface 7 and/or for at least one second control unit 9 in response to performing the function or to an identified pickup, transport or maintenance demand. In prior known solutions, the up-to-date situation is not clear, there is no tracking of finishing the workareas, the only information being a report from the driver. Therefore, anticipation has not been possible for example in an effort to save time.

In one embodiment, the information to be processed and/or presented may comprise a measurement certificate for example for PRD reporting.

In one embodiment, the management of a working machine 1 can be handled in such a way that the processing means 91 establish a remote connection to the working machine 1 for example by any means described in this disclosure for carrying out any function presented in this disclosure, and use the remote connection for affecting the second control unit 9 and the working machine's 1 information system.

In one embodiment, the collection of information from a working machine 1 for transmission to the first control unit 8 and to the first user interface 2 can be conducted by taking advantage of an embedded information system known as such in sophisticated mobile working machines, the information being transferred between its various components by way of a per se known data transfer bus, such as a CAN (Controller Area Network) bus.

In one embodiment, the functions for managing fleet may comprise issuing a working machine transport request, communicating the working machine transport request to a working machine and/or updating a working machine's workarea information and/or section information. The operator or entrepreneur can for example instruct the transfer of a machine to a specific workarea and/or section by means of the first user interface 2, for example by affecting the first selection element 63, the second selection element 64 and/or the third selection element 65. Alternatively, the driver can make a request from the second user interface 7 and the request can be communicated by the second control unit 9 to the first control unit 8 and/or to the first user interface 2. In response to this affecting the first user interface 2 or the second user interface 7, the first user interface 2 and/or the first control unit 8 can be arranged to produce a transport request for the working machine. Communicating the transport request to a transport machine/vehicle may require activation for example from the operator/entrepreneur and/or the driver. Thus, the operator or entrepreneur can activate a transport request for example by means of the first user interface zone 61 and/or the second user interface zone and/or the driver can activate the transport request on his/her part by means of the second user interface 7. The transport request can for example be presented on the discussed user interface for example as a selection element or as a piece of information added to the first selection element 63 or the second selection element 64, and the activation can be conducted for example by affecting the first selection element 63, the second selection element 64 or the third selection element. In response to either making or activating a transport request, the second control unit 9 can be arranged to communicate the transport request to the first control unit 8 and by way of the first user interface 2 to the operator or directly to a transport machine/vehicle organizing or performing the transport, or, in case the transport request has been made or activated on the first user interface 2, to a transport machine/vehicle organizing or performing the transport. Once a forest machine has relocated itself on a new workarea or section, the forest machine is able to update by means of the second control unit 9 over a remote connection or other communication links its new location in the new workarea to the first control unit 8 and/or to the first user interface 2. Thus, the information related to a forest machine, displayed by the first user interface 2, for example by the first user interface zone 61 and/or the second user interface zone 62, is updated as per the prevailing situation.

It is also one benefit of the present invention that the user does not get lost while making choices with selection elements on various hierarchical levels because, in a configuration of selection elements organized in a hierarchical and parallel manner, it is possible to navigate between various hierarchical levels and various side-by-side selection elements readily and intuitively as the connections between selections and objects are visible in a readily perceptible form. Thus, the operator can always move between selection elements for shifting directly between working machines or drivers present in various workareas. If the operator has for example chosen with the first selection element a working machine, it is always possible for the operator to shift directly to another workarea or section with another parallel and/or hierarchical selection element. Respectively, if the operator has chosen a driver, it is possible for him to hop directly onto a different workarea, onto a different machine or section (subworkarea). That is, the hierarchical and parallel configuration and selections present below each hierarchical level enable a selection of desired objects and a review and/or management of the information thereof, while the selection elements are at the same time arranged to present the status of equipment and to display information of the discussed hierarchical level at least in the second user interface zone, preferably also in the first user interface zone.

It is obvious for a skilled artisan that, with advancing technology, there will be a multiple ways of implementing the basic concept of the invention. Accordingly, the invention and its embodiments are not limited to the foregoing example, but may vary within the scope of the claims.

The invention claimed is:

1. A method of fleet management for a fleet having at least two working machines, for use in forestry, the method comprising:
   providing a first user interface for controlling the fleet comprising the at least two working machines,
   presenting on the first user interface a first user interface zone and a second user interface zone such that the first user interface zone and the second user interface zone are presented for a user on the first user interface simultaneously;
   arranging the first user interface zone to display a hierarchical, graphic menu having at least two mutually parallel first selection elements and at least two mutually hierarchical first selection elements, at least one of the first selection elements enabling establishing a remote communication link to a working machine and a terminal device in which the first user interface is provided;
   taking control of the working machine using the remote communication link;
   displaying on the first user interface, in response to a selection made by the user, simultaneously at least two parallel first selection elements, and at least one selectable first selection element related to at least one selection element selected by the user and belonging to a next higher or lower hierarchical level compared to the at least one selected selection element; and
   arranging the second user interface zone to display information based on selections made by the user via the first user interface zone, the information including at least one second selection element for executing at least one function for fleet management, and wherein the function includes presenting at least one item of production data for the working machine to which the remote communication link is established.

2. A method according to claim 1, wherein the first selection elements include both a text portion and a graphical portion depicting the selection.

3. A method according to claim 2, comprising:
arranging at least the text portion or the graphical portion of each of the first selection elements to present information which depicts an object represented by the respective first selection element, is related to an object represented by the respective first selection element, and has been received from said object or from an object linked thereto directly or indirectly.

4. A method according to claim 3, wherein said information presented by each of the first selection elements includes computational information or measurement information depicting the object represented by the respective first selection element.

5. A method according to claim 1, comprising:
determining an appearance of selected first selection elements to be different from that of the at least one selectable first selection elements.

6. A method according to claim 1, comprising:
determining an appearance of at least one non-selectable first selection element to be different from that of a selected one and, on the other hand, from that of the at least one selectable first selection elements.

7. A method according to claim 1, comprising:
arranging the user interface to update further information for the second user interface zone, which information is based on selections made by the user via the first user interface zone, in response to the user affecting a same first selection element again.

8. A method according to claim 1, comprising:
updating at least one of the following is updated to comply with a fleet status as a workarea or work phase changes, in response to a message transmitted by at least one working machine included in the fleet: a selection element presented in the first user interface zone, a number of first selection elements presented in the first user interface zone, a text portion of the first selection element presented in the first user interface zone, or a graphical portion of the first selection element presented in the first user interface zone.

9. A method according to claim 1, comprising:
linking at least some of the first selection elements to the working machines of at least one operator in workareas, to workareas, sections, cutting areas, and/or to drivers of the working machines.

10. A method according to claim 1, wherein at least one selection element represents an object, said object includes at least one of the following: a forest machine, a forest machine transport machine/vehicle, a workarea, a section or a driver.

11. A method according to claim 1, comprising:
performing for managing the fleet, at least one function in response to selections made by the user on the first user interface, said function including at least one of the following:
creating a remote connection to a working machine for reviewing machine information, creating a remote connection to a working machine or to a control system of the working machine, creating a remote connection to a working machine for establishing a voice or instant messaging link to the working machine, creating a remote connection to a working machine for providing navigation instructions for this particular working machine in a map application, establishing a voice link to a selected phone number, initiating a map application for enabling navigation to a working machine, presenting a route traveled by a working machine and/or a transport machine, determining or presenting at least one item of production data or consumption data for a working machine or at least one characteristic calculable therefrom, or presenting at least one past point in time for transportation and presenting at least one future point in time for transportation.

12. A computer program product, in storage on a computer readable medium and executable with a processor, said computer program product comprising:
a non-transitory computer readable program code, which is arranged to carry out a method as set forth in claim 1 as the program code is being executed with the processor.

13. A user interface for managing a fleet including at least two working machines for use in forestry, comprising:
a processor coupled to a memory and configured to execute computer readable program code to control a first user interface for controlling the fleet, and to generate:
a plurality of first selection elements which a user can select by affecting at least one of said first selection elements; and
a first user interface zone and a second user interface zone, said first user interface zone and second user interface zone being presented to a user simultaneously on a same first user interface, wherein
the first user interface zone being configured and arranged to present a hierarchical, graphic menu having at least two mutually parallel first selection elements and at least two mutually hierarchical first selection elements, at least one of the first selection elements enabling establishing a remote communication link to a working machine and a terminal device in which the first user interface is provided;
the first user interface zone being configured to display, in response to a selection made by a user, simultaneously at least two parallel first selection elements, and
at least one selectable first selection element related to at least one selection element selected by the user and belonging to a next higher or lower hierarchical level compared to the at least one selected selection element; and
the second user interface zone being configured and arranged to present information which is based on selections made by the user via the first user interface zone, the information comprising at least one second selection element for executing at least one function for fleet management, and wherein the function includes presenting at least one item of production data for the working machine to which the remote communication link is established.

14. A user interface according to claim 13, wherein the first selection elements comprise:
both a selection depicting text portion and a graphical portion.

15. A user interface according to claim 14, wherein at least the text portion or the graphical portion of a first selection element is configured and arranged to present information which depicts an object represented by the first selection element, is related to an object represented by the first selection element, or has been received from said object or from an object linked thereto directly or indirectly.

16. A user interface according to claim 14, wherein said information to be presented by the first selection element comprises:
    computational information or measurement information depicting an object represented by the first selection element.

17. A user interface according to claim 13, configured to determine an appearance of selected first selection elements to be different from that of the at least one selectable first selection elements.

18. A user interface according to claim 13, configured to determine an appearance of at least one non-selectable first selection element to be different from that of the selected one and, on the other hand, from that of the at least one selectable first selection elements.

19. A user interface according to claim 13, wherein the user interface is configured and arranged to update further information for the second user interface zone, which information is based on selections made by the user via the first user interface zone, in response to the user affecting the same first selection element again.

20. A user interface according to claim 13, configured to update at least one of the following to comply with a fleet status as a workarea or work phase changes, in response to a message transmitted by at least one working machine included in the fleet: a selection element presented in the first user interface zone, a number of first selection elements presented in the first user interface zone, a text portion of the first selection element presented in the first user interface zone, or a graphical portion of the first selection element presented in the first user interface zone.

21. A user interface according to claim 13, wherein at least some of the first selection elements have been linked to the working machines of at least one operator in workareas, to workareas, cutting areas, or to drivers of the working machines.

22. A user interface according to claim 13, wherein at least one first selection element represents an object, said object including at least one of the following: a working machine, a workarea or a driver.

23. A user interface according to claim 13, wherein information, when presented by the second user interface zone and based on selections made by the user via the first user interface zone, will include at least one of the following: sections of a selected workarea, working machines operating in a selected workarea or section, drivers working with or appointed for working machines in a selected workarea or section, finishing degree for a selected workarea, finishing degree for a selected section, finishing degree for a selected section in the workarea, location of a selected working machine, route of a selected working machine, working time for a selected working machine as calculated from a time of a previous maintenance procedure, or notifications issued by a selected working machine, or diagnostic information about a selected working machine with regard to a machine's condition or operating mode.

24. A user interface according to claim 13, comprising:
    the first user interface provided in a fixed or portable terminal device which is provided at a distance from each working machine, or in a carry-on terminal device which is operable at a distance from each working machine.

* * * * *